United States Patent [19]
Tison

[11] Patent Number: 6,132,329
[45] Date of Patent: Oct. 17, 2000

[54] AXLE ASSEMBLY LUBRICANT TEMPERATURE REDUCTION APPARATUS

[75] Inventor: Robert W. Tison, Arden, N.C.

[73] Assignee: Meritor Heavy Vehicle Systems, LLC, Troy, Mich.

[21] Appl. No.: 09/348,779

[22] Filed: Jul. 7, 1999

[51] Int. Cl.⁷ .................................................. F16H 97/04
[52] U.S. Cl. .......................... 475/160; 475/159; 74/607; 184/11.2; 184/6.12
[58] Field of Search ..................... 475/230, 231, 475/248, 252, 159, 160; 184/11.2, 11.1, 6.12, 6.22; 74/607

[56] References Cited

U.S. PATENT DOCUMENTS

| | | | |
|---|---|---|---|
| 3,884,594 | 5/1975 | Fradenburgh | 416/87 |
| 4,560,056 | 12/1985 | Stockton | 475/160 X |
| 4,650,430 | 3/1987 | Schiek | 184/26 X |
| 4,954,122 | 9/1990 | Nakao et al. | 475/160 |
| 5,031,725 | 7/1991 | Millar | 184/6.12 |
| 5,160,290 | 11/1992 | Richburg | 452/135 |
| 5,316,106 | 5/1994 | Baedke et al. | 184/6.12 |
| 5,540,300 | 7/1996 | Downs et al. | 475/160 X |
| 5,839,327 | 11/1998 | Gage | 74/607 |
| 5,890,984 | 4/1999 | Teraoka et al. | 475/160 |

OTHER PUBLICATIONS

580 Super L. Construction King Loader Backhoe Rear Drive Axle Issue Date Mar. 1996; two pages; author Carraro

*Primary Examiner*—Khoi Q. Ta
*Attorney, Agent, or Firm*—Carlson, Gaskey & Olds

[57] ABSTRACT

An apparatus is provided for reducing the temperature of an axle assembly by moving the lubricating fluid from the hotter to the cooler portions of the axle assembly. The axle assembly has an axle housing with a central portion and opposing legs extending from the central portion. A pair of shafts is disposed within the legs. Each of the shafts has an outer surface and first and second opposing ends, with at least a portion of the first ends located within the central portion. A differential gear set is arranged within the central portion and engages the first ends. To cool the lubricant, at least one helical protrusion extends from the outer surface of the shafts at a location adjacent to the differential assembly. The helical protrusions move the lubricating fluid from the first end in the hot central portion of the axle housing to the cooler second end at the extremity of the axle.

7 Claims, 1 Drawing Sheet

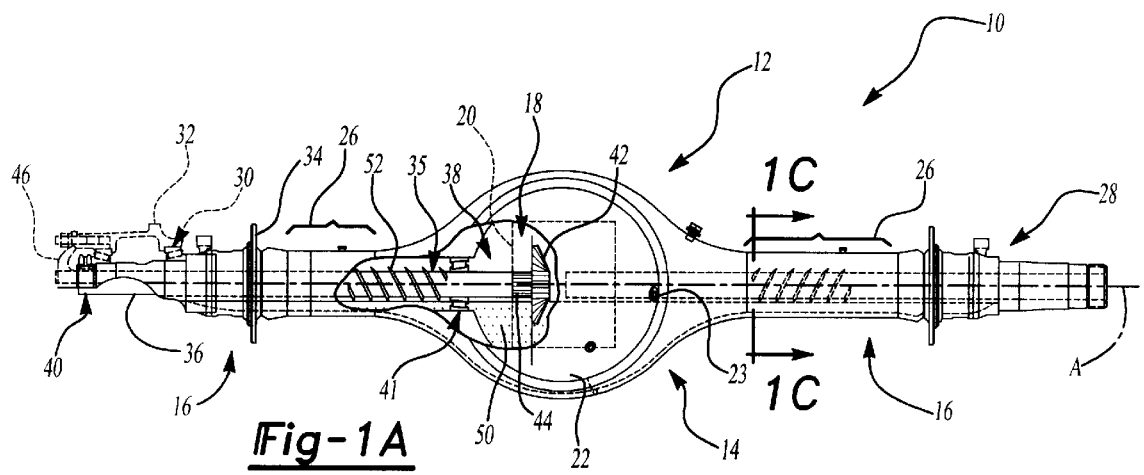
Fig-1A
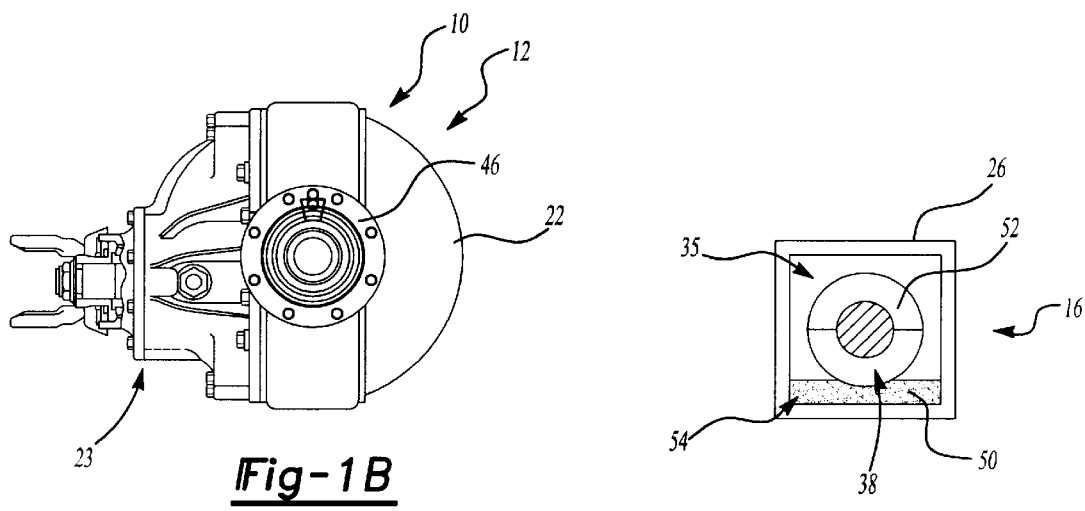
Fig-1B
Fig-1C
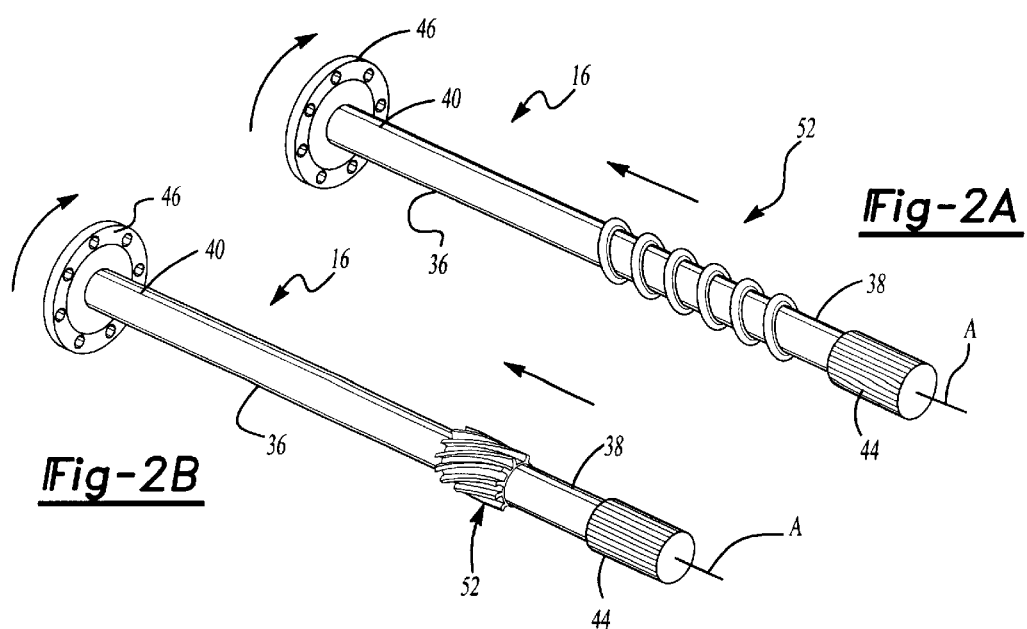
Fig-2A
Fig-2B

AXLE ASSEMBLY LUBRICANT TEMPERATURE REDUCTION APPARATUS

BACKGROUND OF THE INVENTION

This invention relates to an apparatus for reducing axle assembly lubricant temperature by moving the lubricating fluid from the hot central portion of the axle assembly to the typically cooler extremities of the axle assembly where the lubricant temperature may be reduced.

Lubricating fluid within an axle assembly increases in temperature as a result of heat generated from gear inefficiencies, bearing drag, seal drag, and churning losses. High temperatures decrease the useful life of the lubricating fluid and, potentially the useful life of components within the axle. To compound the problem, certain vehicle configurations have minimal air flow over the axle assembly and certain operating conditions may require high axle power transmission, both of which further increase axle lubricant temperatures.

Typically rather complex systems have been employed to cool the lubricating fluid and extend the life of axle components. For example, one system incorporates a separate radiator to cool the axle assembly. However, this design requires that lubricant be pumped to the radiator which adds complexity to the overall axle assembly design.

Axle assemblies incorporating internal braking systems have used helical fins to move lubricating fluid. These systems have been designed to remove heat from the brakes and move the heat toward the central portion of the axle assembly where undesirably hot conditions already exist. Therefore, what is needed is a simple design that removes the heat from the central portion of the axle assembly.

SUMMARY OF THE INVENTION AND ADVANTAGES

The present invention provides an apparatus for reducing the temperature of an axle assembly by moving the lubricating fluid from the hotter to the cooler portions of the axle assembly. The axle assembly has an axle housing with a central portion and opposing legs extending from the central portion. A pair of shafts is disposed within the legs. Each of the shafts has an outer surface and first and second opposing ends, with at least a portion of the first ends located within the central portion. A differential gear set is arranged within the central portion and engages the first ends. To cool the lubricant, at least one helical protrusion extends from the outer surface of the shafts at a location adjacent to the differential assembly. The helical protrusions move the lubricating fluid from the first end in the hot central portion of the axle housing to the cooler second end at the extremity of the axle.

Accordingly, the above-described invention provides an simplified apparatus for reducing axle lubricant temperature.

BRIEF DESCRIPTION OF THE DRAWINGS

Other advantages of the present invention can be understood by reference to the following detailed description when considered in connection with the accompanying drawings wherein:

FIG. 1A is a rear view of the axle of the present invention partially broken away;

FIG. 1B is an end view of the axle of FIG. 1A;

FIG. 1C is a cross-sectional view of the axle taken along line 1C—1C of FIG. 1A;

FIG. 2A is one embodiment of the present invention; and

FIG. 2B is an alternative embodiment of the present invention.

DETAILED DESCRIPTION OF THE PREFERRED EMBODIMENT

An axle assembly 10 for a heavy vehicle such as a commercial truck is shown in FIGS. 1A and 1B. Axle assembly 10 has an axle housing 12 with a central portion 14 and opposing hollow legs 16 extending from central portion 14. Central portion 14 has an inner cavity 18 that houses a differential assembly 20, (shown schematically) which is known in the art. The differential assembly 20 is defined as including the drive gear set, that is, the ring pinion. A cover 22 is welded to central portion 14 to enclose cavity 18. Cover 22 has a plug 23 that allows lubricating fluid 50 to be dispensed into axle assembly 10. A differential carrier assembly 23 is secured to the front of the axle housing 12 and supports differential assembly 20.

Legs 16 have a portion 26 with a quadrangular cross-section adjacent to central portion 14 that terminate in a cylindrical end portion, or spindle, 28. Each end portion 28 has bearings 30 that support a wheel hub 32. A flange 34 is arranged between portion 26 and end portion 28 to support a brake assembly.

A pair of axle shafts 35 is disposed within legs 16. Each of the shafts 35 have an outer surface 36 that defines an axis of rotation, A. Shaft 35 has first 38 and second 40 opposing ends with at least a portion of first end 38 being disposed within central portion 14. A bearing assembly 41 is shown schematically and supports first end 38 within leg 16. In some applications, the first end 38 is supported by the differential assembly 20, and the differential assembly 20 is, in turn, supported by bearing assemblies. A gear 42 is coupled to splines 44 on first end 38 so that differential assembly 20 may drive shafts 16 through gear 42. Second end 40 has an annular flange 46 to which wheel hub 32 is attached.

Lubricating fluid 50 is contained within the housing 12 to lubricate the moving parts and keep the axle temperature within a desired operating range. As mentioned above, dependent upon the application the central portion 14 may be the hottest area of axle assembly 10 while legs 16 are cooler. Therefore, it is beneficial to move hot lubricating fluid 50 from central portion 14 to legs 16 where lubricating fluid 50 can transfer its heat through convection and conduction to the cooler axle components at the extremity of axle assembly 12.

Typically lubricating fluid 50 is at a level that submerses a portion of some of the axle components. For example, differential assembly 20 is partially submersed within the lubricating fluid 50. As differential assembly 20 moves through lubricating fluid 50, the fluid 50 is moved throughout axle assembly 12. Similarly, the movement of other axle components moves lubricating fluid 50 throughout axle assembly 12. However, this manner of moving lubricating fluid to cool axle assembly 12 is inadequate in many circumstances.

In an embodiment of this invention, shafts 16 incorporate at least one helical protrusion 52 extending from outer surface 36 adjacent to differential assembly 20. Helical protrusions 52 are positioned to move lubricating fluid 50 from first end 38, away from hot central portion 14 and towards the second ends 40. By having the helical protrusions 52 in close proximity to central portion 14, hot lubricating fluid 50 may be immediately distributed to the cooler regions within axle assembly 12. Moreover, helical protrusions 52 reduce the volume of lubricating fluid 50 within central portion 14 by pumping it to second ends 40. This movement reduces heat generation and power loss due to churning typically resulting from the differential gear set 20 moving through the lubricating fluid 50. Further, lubricant will be thrown outward from the protrusions 52 onto the inner walls of the housing 12 where the temperature may be reduced by means of convection and conduction.

Preferably, helical protrusion 52 is disposed within portion 26, as best shown in FIG. 1C. By having helical protrusion 52 in a portion of leg 16 having a cross-section of a different shape or a larger opening than the helical protrusions 52, a return passage 54 is created which prevents pressure from building up in leg 16 as lubricating fluid 50 is pumped from first 38 to second end 40. Further, lubricating fluid 50 is permitted to return to central portion 14 from second end 40 to first end 38 after it has been cooled by return passage 54. As shown in FIG. 1C, portion 26 has a rectangular cross-section in which the space between the corner and helical protrusion defines return passage 54, but it is to be understood that portion 26 may have a cross-section of any shape.

Referring to FIGS. 2A and 2B, there may be only one helical protrusion (FIG. 2A) or a plurality of helical protrusions (FIG. 2B) extending from outer surface 36. The direction of normal, forward shaft rotation and flow of lubricating fluid is indicated by arrows for a left shaft 16. In FIG. 2A, an auger-type helical protrusion 52 is shown having only one "fin" with a rather shallow angle. In FIG. 2B, a impeller-type helical protrusion 52 having a plurality of fins is shown having a more aggressive angle of greater than 45° with respect to axis of rotation, A. The number, size, and angle of the helical protrusions may be changed to achieve a desired flow rate of lubricating fluid.

The helical protrusions 52 may be integrally formed with the shafts 16 by roll-forming, casting, or any other suitable method. Alternatively, the protrusions may be attached to the shaft.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An apparatus for reducing the temperature of an axle assembly by moving the lubricating fluid throughout the axle assembly, the apparatus comprising:

an axle housing having a central portion and opposing legs extending from said central portion;

a pair of shafts disposed within said legs, each of said shafts having an outer surface and first and second opposing ends with at least a portion of said first ends being disposed within said central portion;

a differential assembly within said central portion for engaging and driving said first ends; and at least one helical protrusion extending from said outer surface of at least one of said shafts adjacent to said differential assembly for moving the lubricating fluid from said first end towards said second end said protrusion having a spacing and a width with said width being less than said spacing.

2. The apparatus as set forth in claim 1 further including a plurality of said helical protrusions.

3. The apparatus as set forth in claim 2 wherein said outer surface defines an axis of rotation, and said plurality of said at least one helical protrusion have an angle greater than 45° with respect to said axis of rotation.

4. The apparatus as set forth in claim 1 wherein at least a portion of said legs has a cavity spaced from said at least one helical protrusion which defines a lubricating fluid return passage for permitting the lubricating fluid to move from second end to said first end.

5. The apparatus as set forth in claim 4 wherein said at least a portion of said legs has a cross-section with said cavity of a different shape then said axle.

6. The apparatus as set forth in claim 1 wherein each of said pair of shafts has said at least one helical protrusion extending from said outer surface.

7. The apparatus as set forth in claim 6 wherein said at least one helical protrusion is integral with said shafts.

\* \* \* \* \*